(12) United States Patent
Matsuoka et al.

(10) Patent No.: US 7,212,260 B2
(45) Date of Patent: May 1, 2007

(54) COLOR FILTER HAVING COLORED FILM AND BLACK MATRIX, DISPLAY DEVICE USING THE SAME AND METHOD FOR MANUFACTURING THEM

(75) Inventors: Koji Matsuoka, Matsusaka (JP); Mitsuhiro Takeba, Matsusaka (JP); Kenji Takii, Matsusaka (JP); Tsuyoshi Tokuda, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 120 days.

(21) Appl. No.: 10/814,143

(22) Filed: Apr. 1, 2004

(65) Prior Publication Data
US 2004/0207780 A1    Oct. 21, 2004

(30) Foreign Application Priority Data
Apr. 2, 2003  (JP) ............................. 2003-098980
Feb. 25, 2004  (JP) ............................. 2004-048940

(51) Int. Cl.
*G02F 1/1335* (2006.01)
*G02B 5/20* (2006.01)

(52) U.S. Cl. ..................... 349/106; 349/110; 349/187; 430/7

(58) Field of Classification Search ............... 349/106, 349/110, 111, 1, 187; 430/7, 20, 321; 359/891, 359/900; 156/60, 63, 99, 100, 272.2, 275.5
See application file for complete search history.

(56) References Cited

U.S. PATENT DOCUMENTS

| 4,892,613 | A  | * | 1/1990  | Motai et al. ................. 430/312 |
| 6,392,728 | B2 | * | 5/2002  | Tanaka et al. .............. 349/106 |
| 2003/0103179 | A1 | * | 6/2003  | Hayata et al. .............. 349/113 |
| 2004/0233352 | A1 | * | 11/2004 | Chen .......................... 349/106 |
| 2004/0257517 | A1 | * | 12/2004 | Kim et al. ................... 349/155 |
| 2005/0019679 | A1 | * | 1/2005  | Lo et al. ........................ 430/7 |

FOREIGN PATENT DOCUMENTS

| JP | 09-105809 A | 4/1997 |
| JP | 9-152506 | 6/1997 |
| JP | 10-153703 | 6/1998 |
| JP | 2000-105310 A | 4/2000 |

\* cited by examiner

*Primary Examiner*—Tai Duong
(74) *Attorney, Agent, or Firm*—Birch, Stewart, Kolasch & Birch, LLP (57) ABSTRACT

A method for producing a color filter includes forming a resinous black matrix on a substrate, and bonding a color film to the substrate and the resinous black matrix. The edge of the matrix is made thinner than an adjoining portion of the matrix to reduce or eliminate foaming and discoloration.

10 Claims, 13 Drawing Sheets

FIG. 1  PRIOR ART

< Adhesion process >

COLOR FILTER HAVING COLORED FILM AND BLACK MATRIX, DISPLAY DEVICE USING THE SAME AND METHOD FOR MANUFACTURING THEM

This non-provisional application claims priority under 35 U.S.C. § 119(a) on the Patent Application No. 2003-98980 filed in Japan on Apr. 2, 2003, and also on the other Patent Application No. 2004-48940 filed on Feb. 25, 2004, the entire contents of which are hereby incorporated by reference.

BACKGROUND OF THE INVENTION

1. Field of the Invention

The present invention relates to a color filter usable for a display device such as a liquid crystal display, a display device using the color filter, and the method for manufacturing the color filter and the display device.

2. Description of the Prior Art

In recent years, because of outstanding features in terms of light weight, thin configuration, low power consumption, drivability with a low voltage, and the least physical influence on human body, practically applicable range of the liquid crystal display (this will merely be referred to as an LCD hereinafter) device has quickly been expanded. In particular, applicable field of the color LCD devices has sharply been expanded as the one most compatible with the updated color display for personal computers and also for a wide variety of those sophisticated apparatuses compatible with multi-media in trend.

In the field of a variety of color LCD display devices practically being available for various uses in the industrial field, according to the classification in terms of the display mode and the driving method, the one belonging to the "active matrix" type (this will merely be referred to as AM hereinafter) applying the twisted nematic (TN) mode and another one belonging to the "multiplex" type applying the "super twisted nematic (STN)" mode dominantly share the trend respectively. In addition, a wide variety of LCD driving methods have also been proposed, thereby promoting production of the color LCD display devices among the concerned industries based on the diversified display modes and driving methods.

The above-cited LCD modes "TN" and "STN" individually share the identical principles in the field of color display. Concretely, individual pixels are split into a number of dots corresponding to three primary colors. Next, by way of properly controlling voltage added to an LCD layer in each of the split dots, light permeability per dot is properly controlled. As a result, a certain color synthesized from individual three primary colors having controlled light permeability becomes a specific color to be displayed in the corresponding pixel. Normally, the three primary colors are red (R), green (G), and blue (B). Even in the case of adopting other driving methods, the principles of color display remains in common with each other, in other words, in common with the above-cited TN and STN modes.

In order to enable one of the three primary colors corresponding to an individual dot to selectively permeate through it, a color filter (CF) is applied. The color filter is disposed on a surface facing the liquid crystal layer of one of the two substrates made of glass and constituting the LCD. In the active matrix (AM) type LCD, generally, the color filter is disposed on the surface of an opposite substrate devoid of the provision of thin-film transistors (TFT) or diodes (MIM). In the case of the LCD based on the above-cited "super twisted nematic (STN)", the color filter is provided on either of a pair of stripe-form substrates.

Constituents of the LCD are Described Below.

[1] Constitution of the Color Filter:

A certain number of colored layers each colored with one of the three primary colors (R, G, and B) are formed on the color filter CF. Further, in order to shield light, a black matrix BM is formed on the gaps between each of the colored layers, on those portions requiring prevention of light from leakage and also on the margin of the display area.

There is a general method for forming colored layers and a black matrix BM by initially forming the black matrix on a glass substrate followed by a step of forming colored layers on the black matrix. As another method, initially, colored layers are formed on a glass substrate, and then, a black matrix is formed so as to bury gaps between the colored layers.

Then, after completing formation of the colored layers and the black matrix, there is such a case in which an over-coating layer OC is formed on the colored layers and the black matrix so as to fully level off the surface of the color filter. Nevertheless, additional provision of the over-coating layer obliges the coating process to incur much load and poor yield, thereby causing the process for manufacturing the color filter to result in the substantial increase of production cost. From the standpoint of mass production of color filters, it is preferred that the process for forming the above-cited over-coating layer be deleted by all means.

In the following step, in order to drive the LCD display device, transparent electrodes are formed on those layers laminated on the glass substrate. The transparent electrodes are constituted with a compound of indium tin oxide (ITO). In the case of forming a TFT incorporated LCD display device, ITO patterns are formed all over the surface of the LCD display device. In the case of forming the above-referred diode incorporated LCD display device or the LCD display device based on the "super twisted nematic (STN)" mode, stripe patterns are formed in common with each other.

[2] Constitution of the Black Matrix:

To constitute a black matrix, metallic material such as chromium or black resinous material is used. When metallic material is used, because of toxicity of chromium, application of nickel and tungsten formed into a dual-layer constitution mainly prevails recently. In this constitution, a nickel layer is disposed on the display side, whereas a tungsten layer incorporating an extremely high reflection factor is disposed on the part of array. It is essential that the material of the black matrix be provided with a minimum of approximately 3 of optical density (OD) value in consideration of light shielding effect. In order to secure the required optical density, in the case of applying metallic chromium, a minimum of approximately 0.1 μm of film thickness is required. In the case of applying black resinous material, a minimum of 1 to 2 μm of film thickness is required.

In recent years, relative to a market tendency in which metallic tantalum element thus far mainly used for composing thin film transistors and diodes has become rarely procurable and quite expensive, practical use of aluminum increasingly prevails because of its low resistance value, inexpensive cost, and high reflection factor. However, due to multiple reflections caused by aluminum and the material of the black matrix which has an extremely high reflection factor, divergence is caused in characteristics. To cope with this problem, it is urged to lower the reflection factor of the black matrix on the part of the color filter, and in response, there is a progress in the arrangement for lowering the reflection factor of the black matrix since. Viewing from proper characteristics, it is desirable to use black resinous material for composing black matrix so as to meet the demand for lowering reflection factor of black matrix. In contrast with 60% of the reflection factor of metallic chromium, the reflection factor of black resinous material is merely 1 to 3%. Further, reflection spectrum of black resinous material is less dependent on the wave-length, and yet, exhibits neutral black shade. On the other hand, black resinous film is composed with 1 to 2 µm of substantial thickness, and thus, it is likely that this thickness could adversely affect the levelness of the surface of the color filter as a potential problem.

In order to lower the reflection factor, there is another method of applying black matrix composed of a laminate of a chromium-oxide layer and a metallic chromium layer or a laminate of a nickel layer and a tungsten layer. However, in this case, compared to the black matrices composed of black resinous material, either of the above laminate layers exhibits a reflection factor of 3 to 5%, which is higher than that of the black resinous material, and yet, instead of neutral black shade, the above laminate layers contain bluish purple shade as another problem. Further, normally, metallic double layers are processed via a sputtering method in the course of forming films, and thus; this process causes the productive efficiency to be lowered to result in the rise of production cost as another disadvantageous problem.

[3] Method of Forming Resinous Black Matrices:

There are a variety of practical methods for forming black matrices with black resinous material on a glass substrate. Typical examples are cited below.

[Method 1]

First, a glass substrate is superficially coated with negative light sensitive black resinous material so as to form a thin film thereon. This process can be implemented by coating the substrate surface with the black resinous material via a spin coater, or by adhering a piece of black resist material previously formed into a film onto the surface of the glass substrate, or by applying cascaded coating processes. Next, the surface of the glass substrate is irradiated with UV rays via photomasks having a predetermined black-matrix pattern to cause the exposed portion of the black resinous material to be hardened. Then, by removing unexposed portions of the black resinous material via a developing process, black matrices are thus formed eventually.

[Method 2]

First, as was performed for the method 1, negative light-sensitive uncolored resinous material is spread over the surface of a glass substrate so as to form a thin film. Next, as was performed for the method 1, the resinous film is exposed and developed so as to shape pattern of the original black matrix. Next, the pattern formed portion is colored with black shade by applying a non-electrolytic plating method or a dyeing method for example.

[Method 3]

First, as was performed for the method 1, black resinous material compatible with a developing process is spread over the surface of a glass substrate. Next, positive photo-resist pattern is formed on the surface of the material, and then, as was performed for the method 1, exposing and developing processes are serially executed. In the course of the developing process, photo-resist and black resinous materials are jointly removed. Next, by applying a thermal treatment, the black resinous material is cross-linked and hardened. Finally, unexposed resist component is removed.

[4] Formation of Colored Layers:

First, colored pigment is dispersed into resinous material in advance. Then, the resinous material containing dispersed pigment is spread over the surface of a glass substrate so as to form a thin film. In the next step, the thin film is patterned into a predetermined form by applying a photo-lithographic method (this will be referred to as the "pigment dispersion method" in the following description). Colored layers can also be formed by applying any of those methods including the following: a method which initially spreads light-sensitive resinous material over the surface of a glass substrate so as to form a thin film and pattern the film into a predetermined form and then colors the patterned film: a method which initially causes color pigment to be dispersed into resinous material and then prints the colored resinous material into a predetermined pattern on the surface of a glass substrate (this will be referred to as the "printing method" in the following description): a method which initially causes pigment and resinous material to be jointly dispersed in solution and then forms a predetermined pattern on a glass substrate via an electro-deposition process: a method which previously forms colored resist material into a thin film and then bond the colored thin film onto the surface of a glass substrate (this method is called the "dry film lamination (DFL)": and a coloring method by applying an ink-jet coloring system. Since the object of the present invention is to overcome those problems existing in the DFL method, the following description will solely refer to the DFL method.

Figure 1:
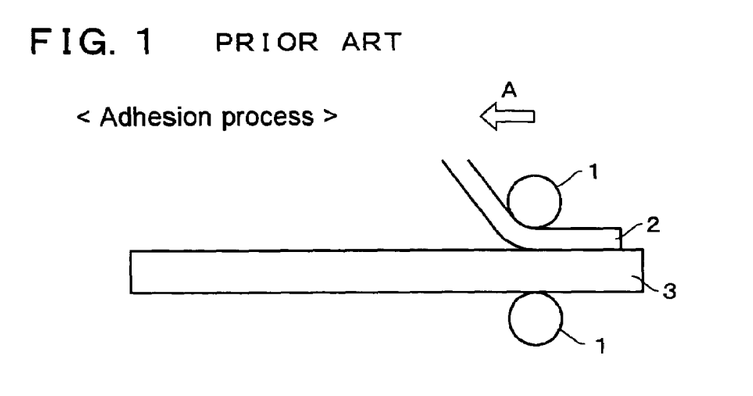
FIG. 1 is a schematic cross-sectional view of a laminating process based on the DFL (dry film lamination) method.

In the course of forming colored layers by applying the DFL method, it is so arranged that, initially, a thermal treatment is applied to a glass substrate patterned with the resinous black matrix material, and then, thermally adheres pasting material consisting of film-form colored layers stripped of a cover film on one side. This processing step is called a laminating process. FIG. 1 schematically exemplifies the laminating process, in which the reference numeral 1 represents a pasting roller, 2 a pasting material, and 3 represents a glass substrate. In the laminating process, as shown via an arrowed symbol A, the pasting roller 1 is shifted in one direction. Next, the other side cover film (not shown) on the colored layers is stripped off. Then, the colored layers are subject to an exposing process by applying a collective exposure mask or a stepper system, and then, organic components are removed via a post-exposing process. Finally, the colored layers are treated with a post-baking process.

Even when forming the black matrix resinous material via the pasting process performed in the method 1, the laminating process shown in FIG. 1 is introduced. In this case, resinous black matrix material prepared in the film form is used to function as the pasting material 2.

Normally, when manufacturing the color filter based on the above-referred DFL (dry film lamination) method, formation of the resinous black matrix material is preceded by the formation of the colored layers comprising a red layer, a blue layer, and a green layer. This sequence prevents foaming from being generated at the interface between the glass substrate, the resinous black matrix material, and the colored layers. The cause of the foaming will be described later on. When inserting the resinous black matrix material into the gap between individual colored layers, such a method is applied, which causes the back surface of resinous black matrix material to be exposed to harden. As described earlier, at least a minimum of the value 3 is required for the optical density. Further, inasmuch as users strongly demand in recent years that back-light luminance be enhanced furthermore, in order to enable the black matrix to properly shield light, it is desired to further secure reliable material capable of providing a minimum of the value 4 of optical density.

Figure 2:
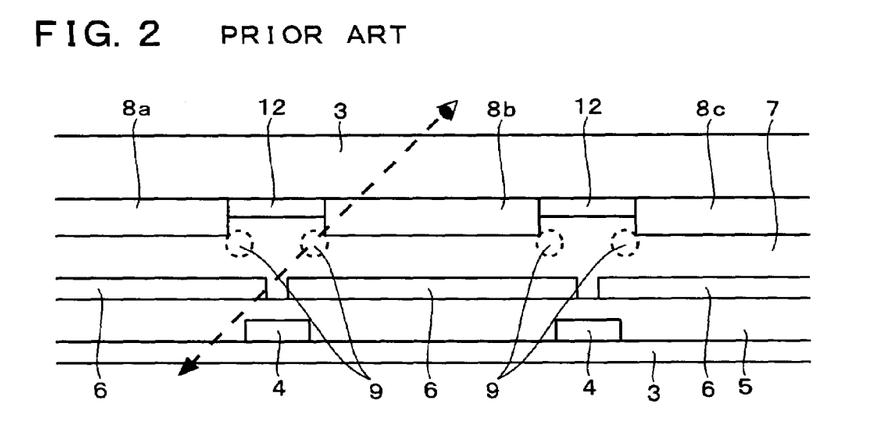
FIG. 2 is a cross-sectional view schematically illustrating the principles of why disordered orientation is observed when a resinous black matrix has been formed after forming colored layers based on the DFL method.

However, when causing the resinous black matrix material to be exposed from the back side to harden, unless the available material contains a minimum of the value 4 of optical density and reduces height difference from the colored layers, disorder in orientation will be observed at the junction between the resinous black matrix material and the colored layers. Principles of the observable orientation disorder are shown FIG. 2, in which the reference numeral 3 represents a glass substrate, 4 a source wiring installed in the TFTs, 5 an insulating film, 6 a pixel electrode, 7, a liquid crystal layer, 8a, 8b, 8c are respectively a colored layer each being colored with different colors, and 12 represents resinous black matrix material having a certain number of stripe-form openings, through which the above colored layers 8a, 8b, and 8c with a striped formation are respectively exposed. As shown in FIG. 2, when a user's eyes incline from the direction perpendicular to the LCD screen, user can observe plural portions beneath the resinous black matrix material 12 via the lateral surfaces of the colored layers 8a, 8b, and 8c. Disordered orientation appears in these portions 9.

Figure 3:
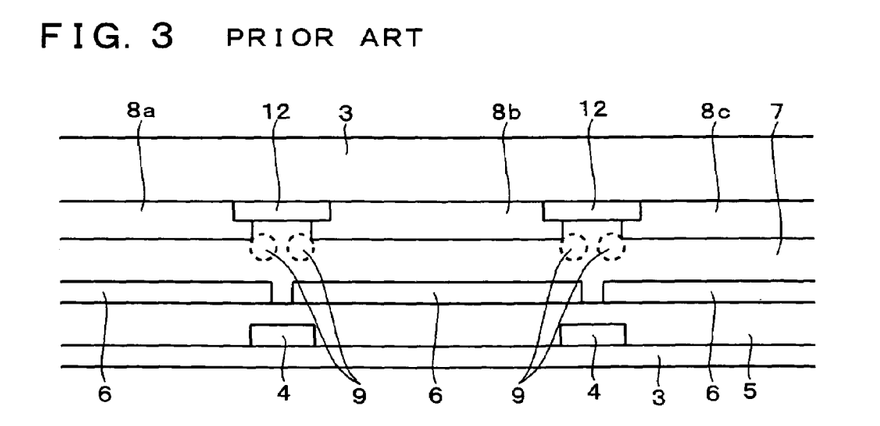
FIG. 3 is a cross-sectional view schematically illustrating the principles of how disordered orientation is prevented from being observed when colored layers have been formed after forming a resinous black matrix based on the DFL system.

To compensate for this faulty phenomenon, as in the case of applying the "pigment dispersion method" cited above, when forming the colored layers 8 after formation of the resinous black matrix material 12, the color layers 8 are superposed on part of the resinous black matrix material 12 to cause the black matrix portion to be concealed totally, thereby correcting the disordered orientation. FIG. 3 exemplifies the principles for preventing users from observing the disordered orientation by way of implementing the above method. Since the resinous black matrix material overlaps the edges of the colored layers 8a, 8b, and 8c, the user will no longer observe the portions 9 via lateral surfaces of the colored layers 8a, 8b, and 8c, thereby fully concealing the disordered orientation by means of the resinous black matrix material 12 and the source wiring 4 on the array side.

According to the previous invention duly disclosed in the Japanese Laid-Open Patent Application No. H09-105809, in order to prevent levelness from being lost by the swollen portion of the colored layers 8 on the resinous black matrix material 12 in the course of forming the colored layers 8 by applying the above-referred "pigment dispersion method", it is so arranged that, by providing edge of the mask regulating external shape of the colored layers with fine waveforms, the rise of the edge of the colored layer 8 is gradual.

Figure 4:
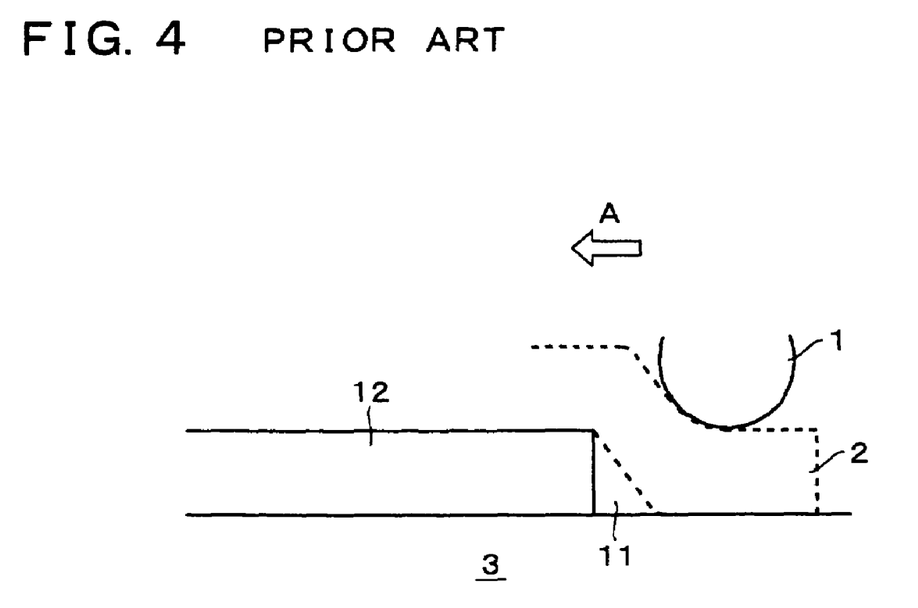
FIG. 4 is a cross-sectional view schematically illustrating the principles of causing foaming phenomenon to be generated at the gap between the substrate, the resinous black matrix, and the colored layers in the course of forming the colored layers after forming the resinous black matrix based on the DFL method.

On the other hand, when applying the above DFL (dry film lamination) method, as shown in FIG. 1, the pasting material for constituting the colored layers is adhered in one direction by operating a pasting roller 1, when the pasting material 2 overleaps wall of the resinous back matrix material (not shown), foaming is apt to be generated at the interface between the substrate 3, the resinous black matrix material, and the pasting material 2. The aspect related to the generation of foaming is shown in FIG. 4, in which foaming 11 is generated at the interface between a side surface on the upstream side of the pasting direction A of the resinous black matrix material 12, the upper surface of the substrate 3, and at the bottom surface of the pasting material 2. Once the foaming 11 has ever been generated, the pasting material 2, i.e., the colored layers 8 complete with patterning via exposure and development, are discolored, thus resulting in the degraded quality of the produced image.

SUMMARY OF THE INVENTION

In the light of the above problems, the present invention has been achieved. The present invention reduces discoloration of colored layers at portions close to the resinous black matrix material which otherwise might result from initially forming resinous black matrix material and pasting it over the colored layers. The present invention may also reduce discoloration of colored layers at portions close to the resinous black matrix material. The present invention encompasses a display device incorporating the color filter manufactured by implementing the inventive method.

According to one embodiment of the present invention, a method for fabricating a color filter by bonding a colored film on a substrate having a resin black matrix formed thereon includes the step of: forming beforehand a height difference in the resin black matrix so that an edge portion of the resin black matrix located on the upstream side with respect to the direction in which the colored film is bonded is made lower than the other portion of the resin black matrix.

According to this method, when the colored film overlaps an edge of the resinous black matrix material, it is possible to force atmospheric air away from the surface of the substrate to the upper portion of the edge of the resinous black matrix material, thereby preventing foaming phenomenon from being generated at the interface between the substrate, the resinous black matrix material, and the colored film, or at least reducing the foaming phenomenon. Even if some foaming has been generated at the interface with the substrate, inasmuch as the height of the edge portion of the resinous black matrix material is lower than that of other portions, only a negligible amount of the foaming will be generated, and discoloration will be minimized.

Advisably, the resin black matrix is formed of a negative resist by a process involving exposure through openings formed in a mask followed by post-development, and a plurality of minute openings are formed in the portion of the mask corresponding to the edge portion of the resin black matrix so that the edge portion of the resin black matrix is thereby made lower than the other portion thereof. Introduction of this method enables formation of satisfactory edge portion quite easily.

According to another embodiment of the present invention, in a color filter provided with a substrate, a resin black matrix formed on the substrate and having an opening, and a colored film laid so as to cover from over the portion of the substrate located inside the opening of the resin black matrix to over the resin black matrix, an edge portion of the resin black matrix located along the opening and under the colored film is made lower than the adjacent portion of the resin black matrix. This color filter can be manufactured by applying the above-specified method. Accordingly, it is possible to prevent discoloration from being generated otherwise caused by occurrence of foaming phenomenon.

BRIEF DESCRIPTION OF THE DRAWINGS

The above and further objects and features of the present invention will more fully be understood from the following description, taken in conjunction with the preferred embodiments with reference to the accompanying drawings in which.

DESCRIPTION OF THE PREFERRED EMBODIMENTS

Figure 5:
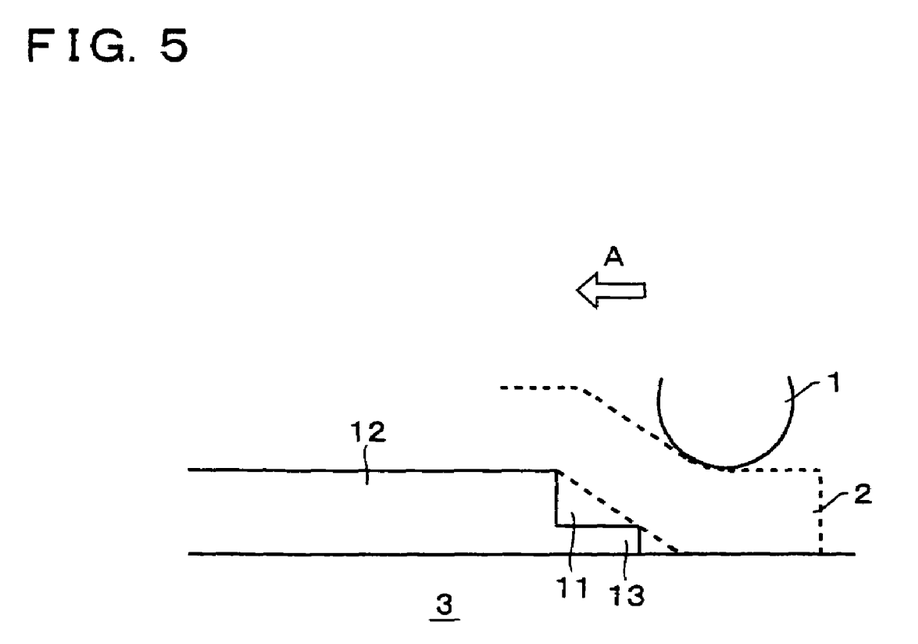
FIG. 5 is a cross-sectional view schematically illustrating the principles of suppressing generation of foaming phenomenon at the gap between the substrate, the resinous black matrix, and the colored films, effectuated by the present invention.

FIG. 5 schematically illustrate the principles for causing foaming phenomenon to be prevented at the interface between the substrate, the resinous black matrix, and the colored film as previously arranged by the present invention. As is clear from the comparison between the conventional system shown in FIG. 4 and the inventive system shown in FIG. 5, the height of an edge portion 13 of the resinous black matrix 12 is lower than that of other portions. As a result, foaming is reduced or eliminated. According to the inventive system shown in FIG. 5, it is possible to guide any foam that might be generated on a substrate 3 to a portion right above the edge 13 of the resinous black matrix 12. Note that the foam in area 11 led onto the edge portion 13 of the resinous black matrix 12 does not generate adverse influence over the peripheral portions.

Referring now to the accompanying drawings, practical forms for implementing the present invention are described below.

Serial processes for manufacturing a color filter are individually shown in FIG. 6A to 6G, FIG. 7A to 7G, FIG. 8A to 8G, and FIG. 9A to 9G. Of these, FIG. 6A to FIG. 9A respectively represent a state in which a resinous black matrix 121 is provided with a mask 14. FIG. 6B to FIG. 9B respectively represent a state in which the resinous black matrix 121 has been patterned. FIG. 6D to FIG. 9D respectively represent a state in which the patterning-completed resinous black matrix material 121 is baked into the resinous black matrix 12 having differential height. FIG. 6F to FIG. 9F respectively represent a plan view adhered with a colored layer 8. FIG. 6C to FIG. 9C, FIG. 6E to FIG. 9E, and FIG. 6G to FIG. 9G, respectively represent cross-sectional views taken on line B to B' shown in FIG. 6B to FIG. 9B, FIG. 6D to FIG. 9D, and FIG. 6F to FIG. 9F.

The resinous black matrix material 121 was prepared by applying a product of Fuji Film Co., Ltd., called KU1. The resinous black matrix material KU1 was pasted onto the surface of a glass substrate 3 at 1.3 m/min. of bonding speed at 100° C. of substrate temperature and 130° C. of the pasting roller temperature. Insofar as no problem can be generated in the adhesive strength, the resinous black matrix material 12 may be subject to an optional temperature for performing a thermal treatment. Further, any resinous black matrix material may also be used.

After completing adhesion of the resinous black matrix material 121 onto the surface of the glass substrate 3 having 680 mm×880 mm×0.6 mm of own dimension, the resinous black matrix material 121 is patterned by applying any of the four kinds of mask 14 shown in FIG. 6A to FIG. 9A.

Figure 6A:
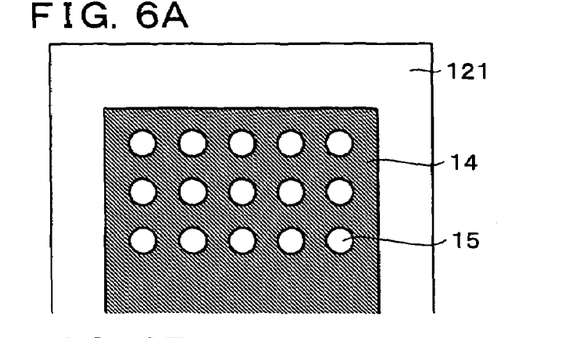
FIG. 6A to FIG. 6G schematically illustrate a processes for manufacturing a color filter according to one embodiment of the present invention.
Figure 6B:
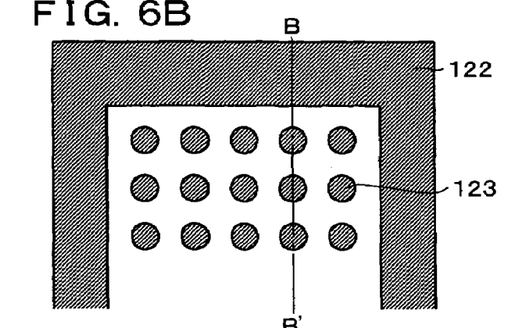
Figure 6C:
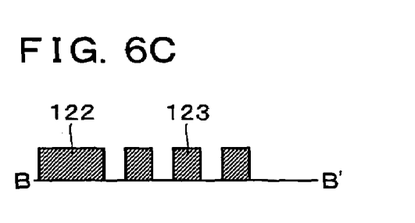
Figure 6D:
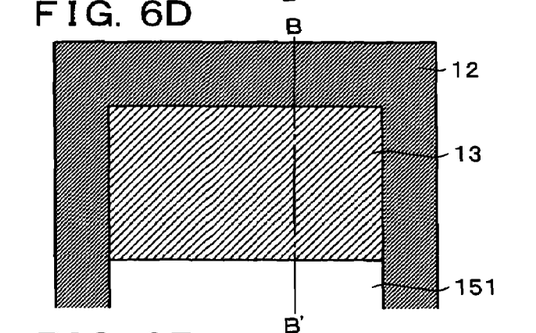
Figure 6E:
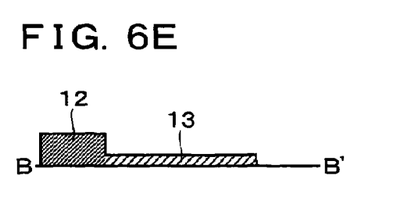
Figure 6F:
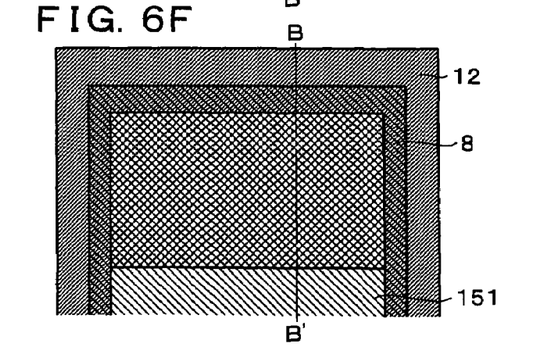
Figure 6G:
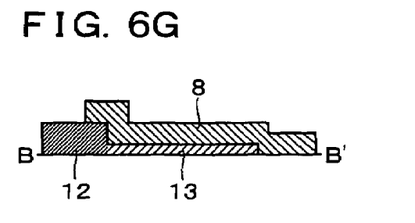
Figure 7A:
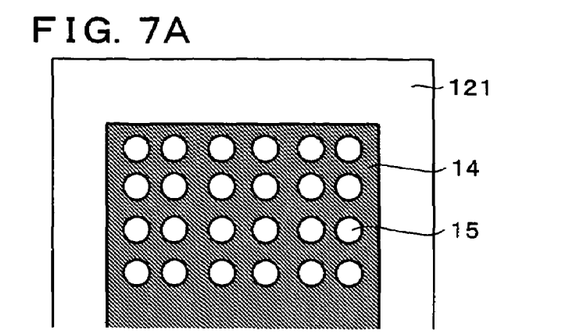
FIG. 7A to FIG. 7G schematically illustrate a processes for manufacturing a color filter according to another embodiment of the present invention.
Figure 7B:
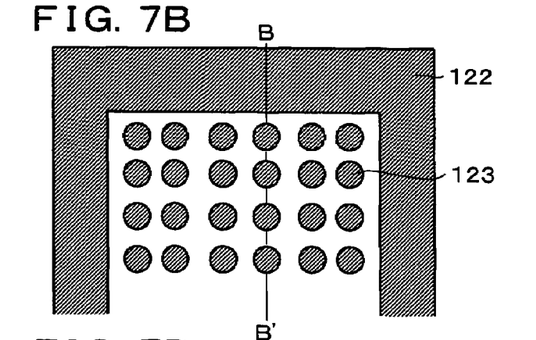
Figure 7C:
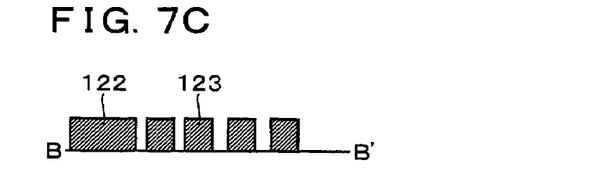
Figure 7D:
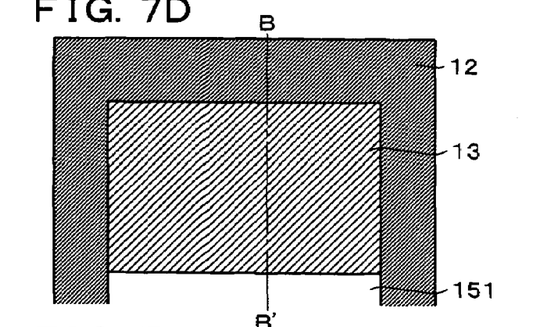
Figure 7E:
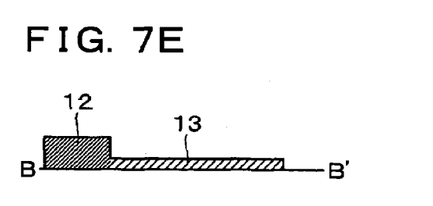
Figure 7F:
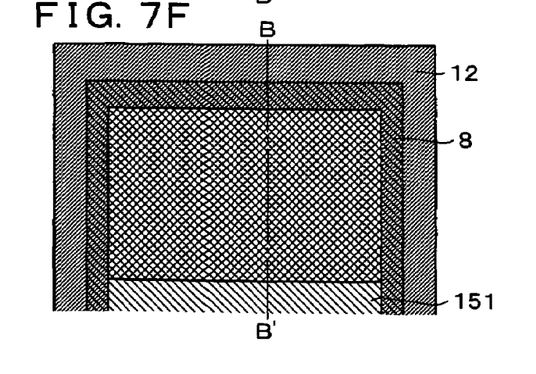
Figure 7G:
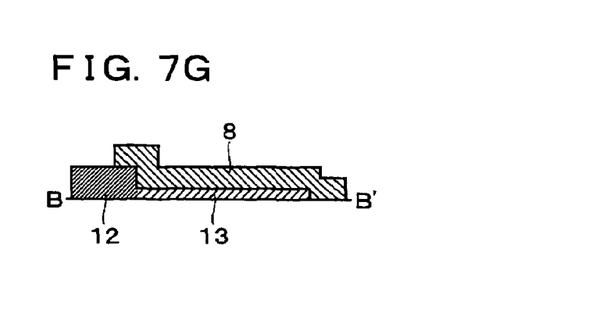
Figure 8A:
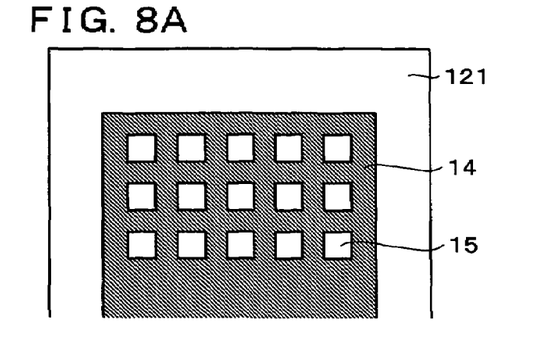
FIG. 8A to FIG. 8G schematically illustrate a processes for manufacturing a color filter according to another embodiment of the present invention.
Figure 8B:
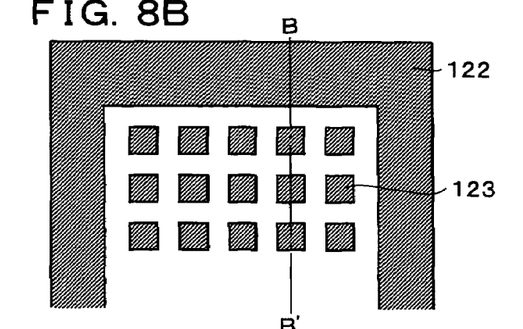
Figure 8C:
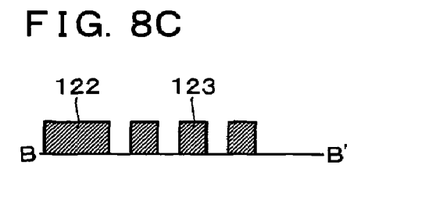
Figure 8D:
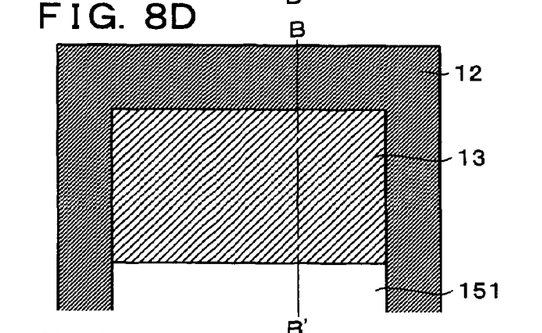
Figure 8E:
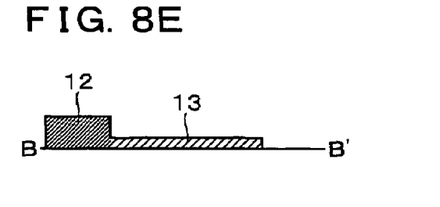
Figure 8F:
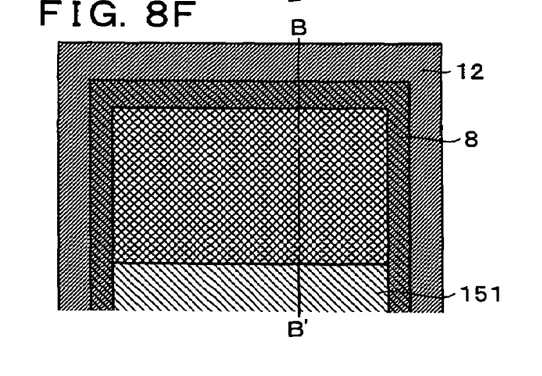
Figure 8G:
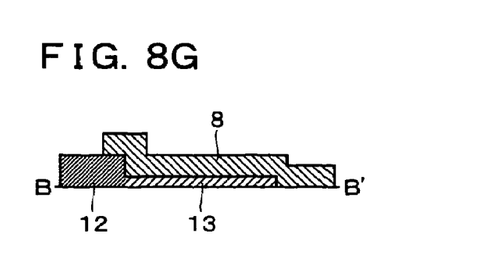

In FIG. 6A, a mask 14 is provided for exposing unexposed resinous black matrix material 121 (used for composing a coating film required for forming a resinous black matrix prior to an exposing process) consisting of negative-type light-sensitive black resinous material, where openings 15 are individually designed so as to form a plurality of circular dots each having 4 μm of diameter, and yet, the mask 14 is patterned with 4 μm of intervals between individual dots. In FIG. 7A, each of the openings constitutes a circular dot having 4 μm of diameter, where individual dots are disposed across 2 μm and 4 μm of intervals in the mask. In FIG. 8A, each of the openings 15 consists of a square dot having 4 μm of length per side, where each of the square openings is disposed across 4 μm of intervals in the mask. In FIG. 9, each of the openings 15 consists of a square dot having 4 μm of length per side, where the square openings are individually disposed across 2 μm and 4 μm of intervals in the mask.

In any of the above examples shown in FIG. 6A to FIG. 9A, it was arranged to draw the mask 14 in conformity with the designed mask openings via vapor-phase deposition of chromium on the surface of a glass substrate having 800 mm×920 mm×10 mm of dimension. Further, by providing 150 µm of gap between the mask and the glass substrate, the resinous black matrix material (curable via exposure to I rays) was exposed via irradiation with a lamp emitting GHI rays. Then, individual patterns were processed with 100 mJ of exposed volume and via immersion into developing solution containing organic alkaline developing solution PD, CD, and SD, a product of Fuji Film Co., Ltd, so that, as shown in FIG. 6B to FIG. 9B, dot patterns 123 were formed on the exposed resinous material 122 at the positions near those portions that would become stripe-form openings. Further, the dot patterns 123 were melted by baking resinous material 122 so as to bury the gap between all the dot patterns, thereby completing formation of the edge portions 13 having a height lower than that of other portions as shown in FIG. 6D to FIG. 9D.

It was confirmed via observation against the resinous black matrix material that an evenly thin edge portion 13 was eventually secured. It was confirmed that those portions other than the edge portion 13 of the resinous black matrix material 12 had 1.4 µm of height, whereas it was found that the height of the edge portion 13 decreased to 0.8 µm by substantially one half, thus eventually secured a height difference as measured from the substrate. The fact representing that the height position of the edge portion 13 is lower than that of other portions means that the height from the base portion of the edge portion 13 of the resinous black matrix material 12 up to the surface is actually lower than the height from the base portion of other portions of the resinous black matrix material 12 up to the surface. In other words, thickness of the edge portion 13 of the resinous black matrix material is thinner than that of other portions.

Figure 9A:
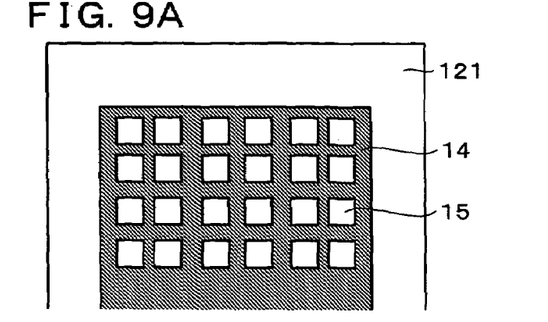
FIG. 9A to FIG. 9G schematically illustrate a processes for manufacturing a color filter according to a still further embodiment of the present invention.
Figure 9B:
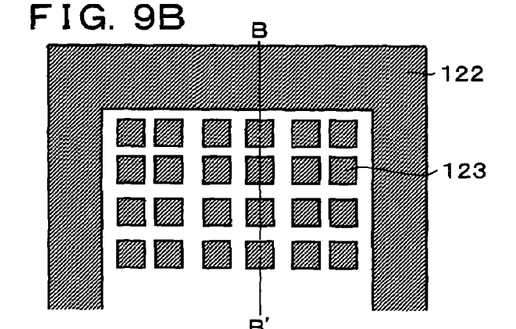
Figure 9C:
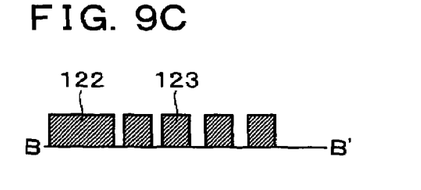
Figure 9D:
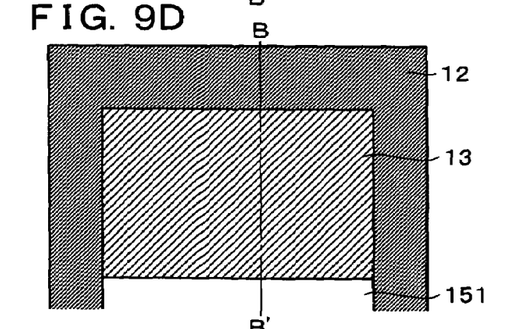
Figure 9E:
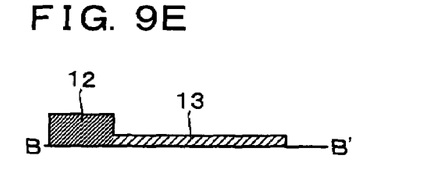
Figure 9F:
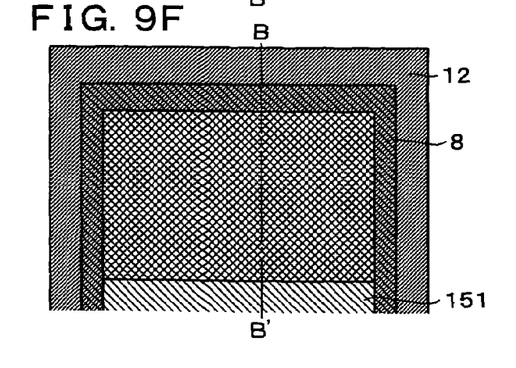
Figure 9G:
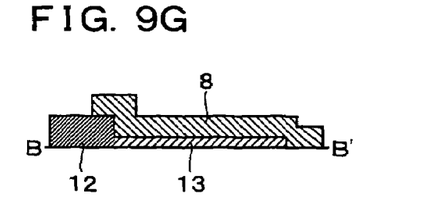

As shown in FIG. 7A and FIG. 9A, by way of varying the intervals between individual dots (openings 15) and the magnitude of the open dots per location in the mask 14, formation of the edge portion 13 of the resinous black matrix material 12 can be implemented more easily.

Figure 10A:
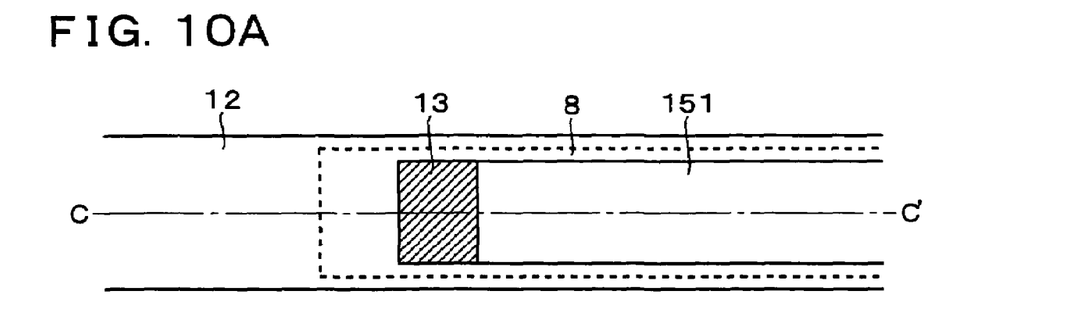
FIG. 10A and FIG. 10B schematically illustrate a plan view and a cross-sectional view, respectively, of the completed form of a color filter secured by implementing an embodiment of the present invention.
Figure 10B:
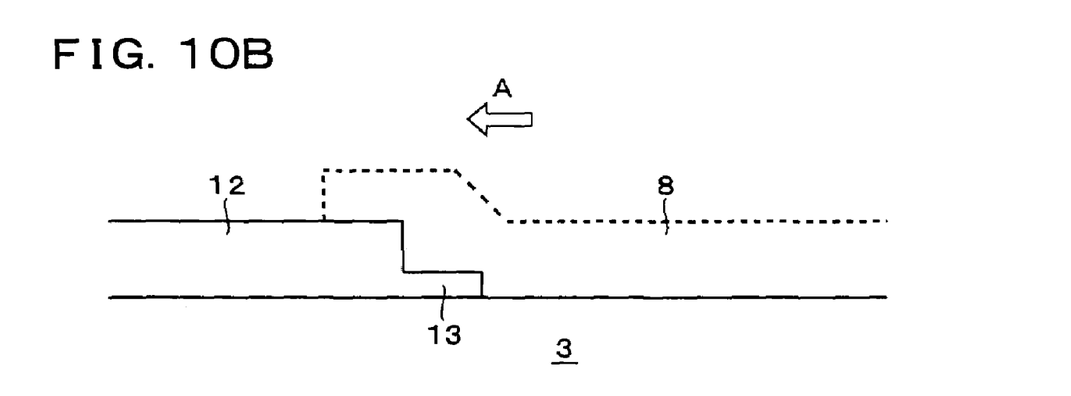

Next, as shown in FIG. 6F to FIG. 9F, based on the DFL (dry film lamination) method, film-form pasting materials individually containing various colors were bonded onto a substrate accommodating the resinous black matrix 12 shown in FIG. 6D to FIG. 9D securing satisfactory height difference. Colored films were also bonded to the substrate under the same condition as was applied to the bonding of the resinous black matrix 12 onto the identical substrate. Each of the colored films contained colored layers having 1.8 µm of the finish-up film thickness. After closely observing the completed color filter added with colored films, it was confirmed that no foaming was generated. The completed form of the color filter is shown in FIG. 10A and 10B. FIG. 10A shows a plan view, whereas FIG. 10B shows a cross-sectional view taken on line C to C' shown in FIG. 10A. The reference numeral 151 represents opening of the resinous black matrix 12.

Figure 11A:
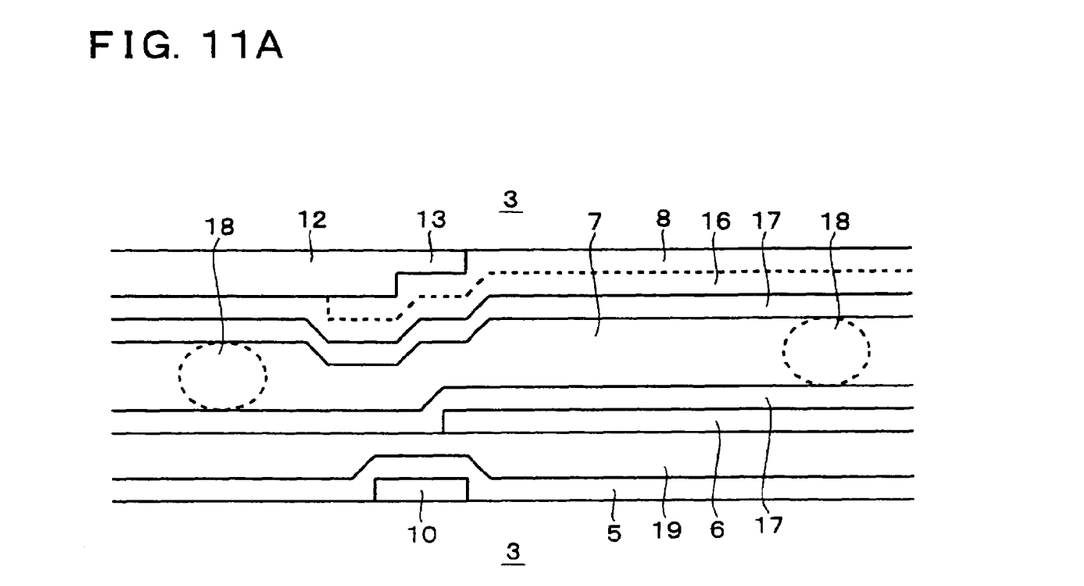
FIG. 11A and FIG. 11B illustrate schematic views of specific structures of LCD devices incorporating a color filter manufactured according to an embodiment of the present invention.
Figure 11B:
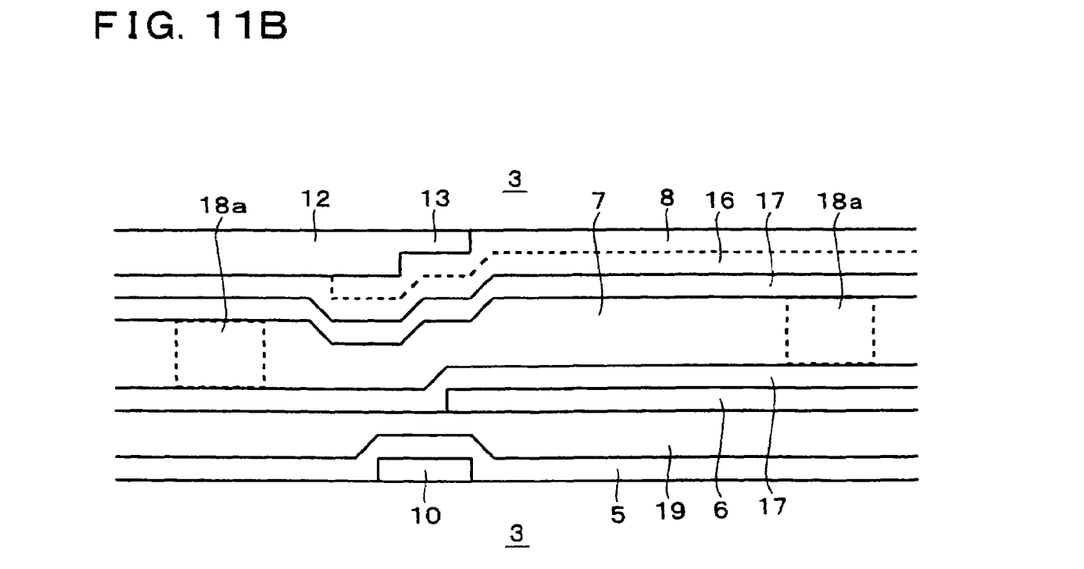

Constitutions of LCD devices incorporating the above-referred color filter are schematically shown in FIG. 11A and 11B. FIG. 11A presents an example of applying a number of plastic beads 18 for securing thickness of a liquid crystal layer 7. FIG. 11B presents an example of adhering a plurality of pillars 18a to an orientation film 17 on the part of an opposite transparent electrode 16 so as to secure thickness of the liquid crystal layer 7. Note that the reference numeral 5 represents an insulating film, 6 represents a pixel electrode, 10 represents a gate wiring, and 19 represents an interlayer insulating film.

Figure 12A:
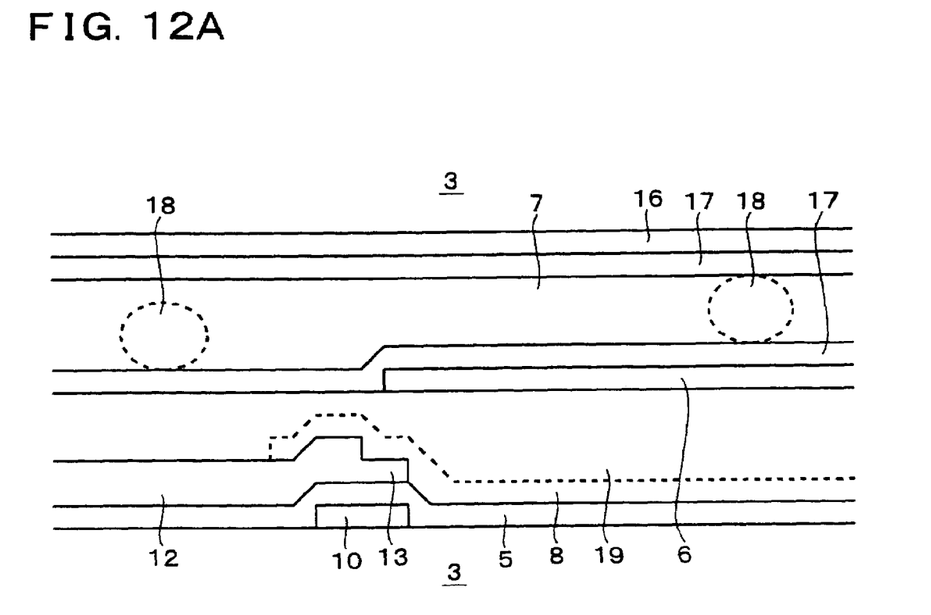
FIG. 12A and FIG. 12B illustrate schematic views of other specific constitutions of LCD devices incorporating a color filter secured by implementing an embodiment of the present invention.
Figure 12B:
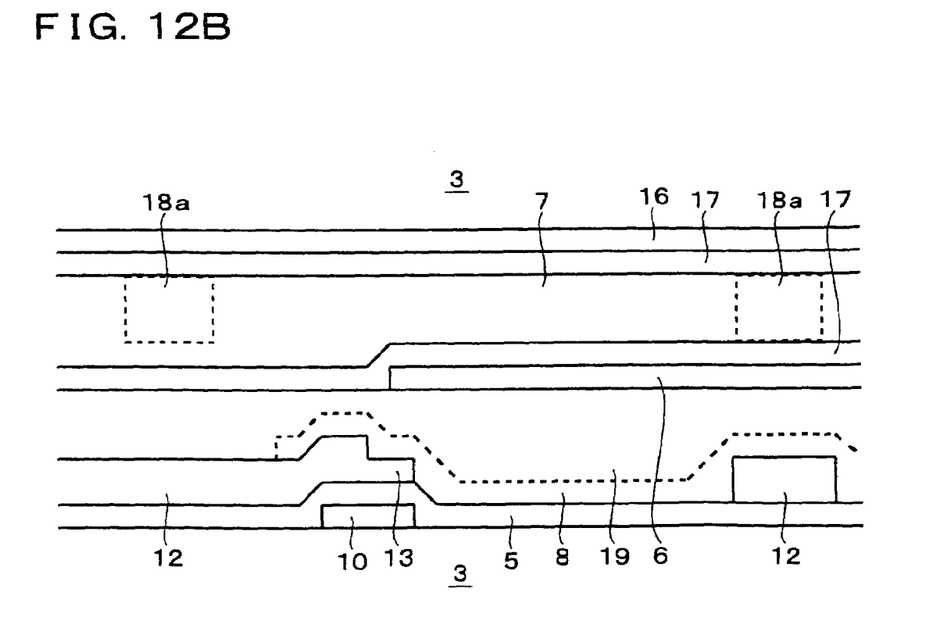

It is also possible to dispose the color filter on the array side, that is, between the liquid crystal layer 7 and TFTs. This example is shown in FIG. 12A and FIG. 12B.

In the above-mentioned examples, height of the edge portion 13 of the resinous black matrix 12 was designed to be 0.8 µm. It is preferred that the height of the edge portion 13 be a minimum of 0.5 µm and a maximum of 1 µm. By providing the edge portion 13 with the recommended height value, it is possible to effectively prevent foaming from being generated, and yet, it is also possible to prevent the edge portion 13 of the resinous black matrix 12 from excessively being thinned.

Further, it is also preferred that, by arranging the sharing ratio of the openings 15 against the total area of the mask 14 to be a minimum of 25% and a maximum of 50%, width of the edge portion 13 of the resinous black matrix 12 shall also share a minimum of 25% and a maximum of 50% against total width of the resinous black matrix 12. This arrangement prevents the edge portion 13 of the resinous black matrix 12 from incidentally dissolving pattern in conjunction with other portions.

Figure 13A:
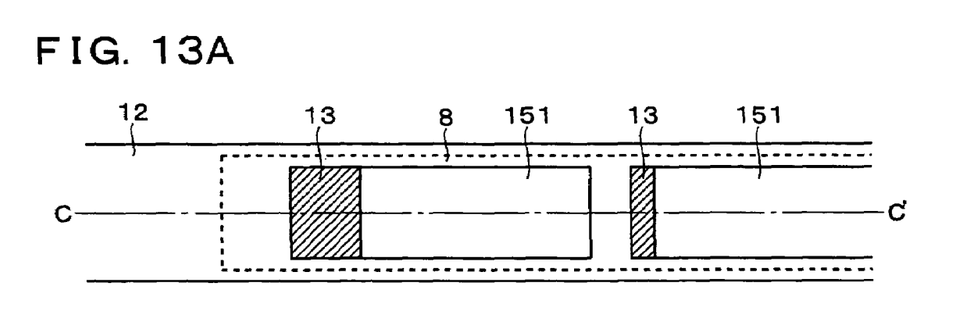
FIG. 13A and FIG. 13B illustrate a plan view and a cross-sectional view, respectively, for schematically showing the completed form of a color filter prepared by a process according to the present invention, which incorporates a resinous black matrix in the peripheral portions and inside of pixels.
Figure 13B:
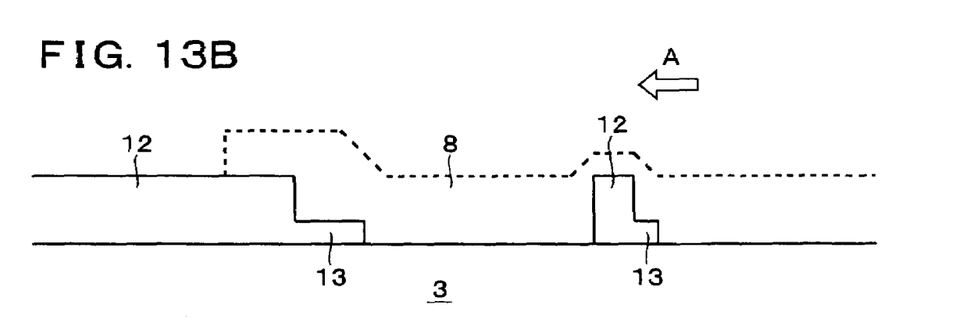
Figure 14A:
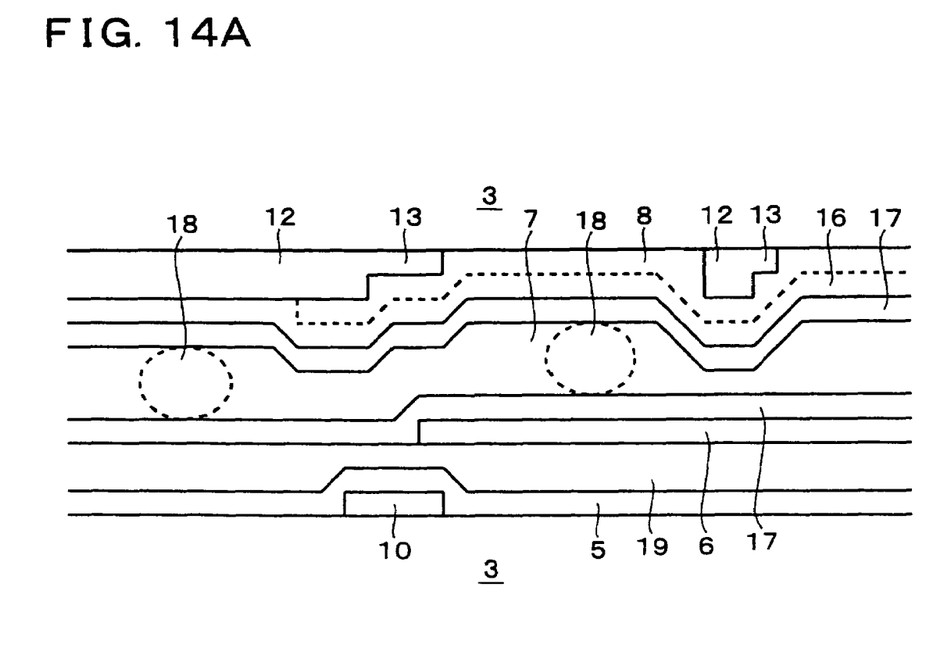
FIG. 14A and FIG. 14B schematically illustrate specific examples of LCD devices incorporating the color filter shown in FIGS. 13A and 13B.
Figure 14B:
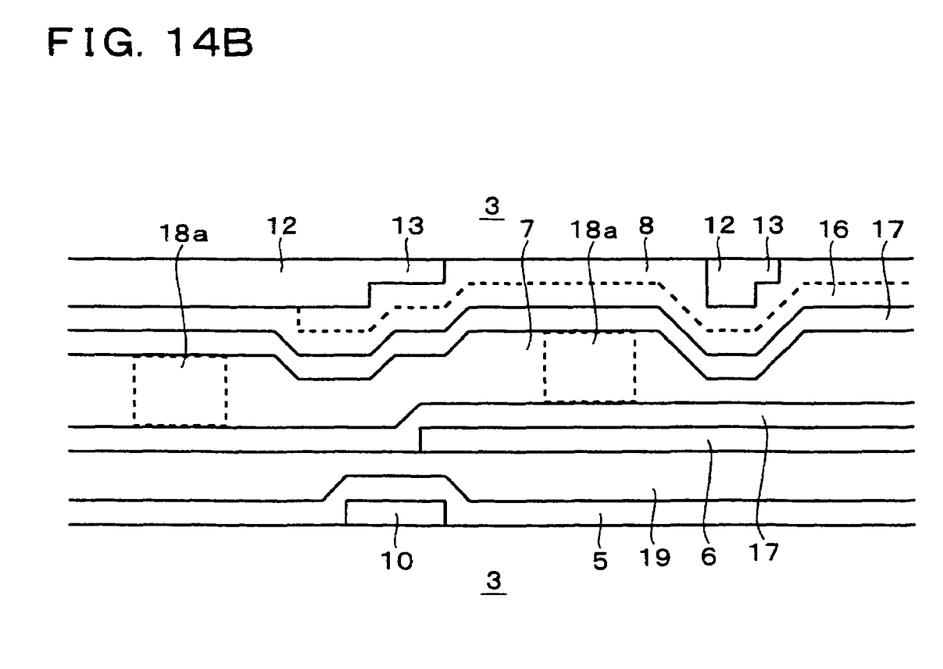

The invention is applicable to not only the above-cited circular form or square form, but also to openings of elliptic form or polygonal form in addition to the square form, or to any suitable configurations. The present invention is also applicable to cope with over-ride phenomenon of colors inside of pixels. For example, as shown in FIG. 13A and FIG. 13B, in the case in which a discrete portion of the black matrix fully surrounded by other portions of the black matrices (fully dissociated from other portions) exists, as in the case of peripheral black matrix, when a color film rides over this portion of the black matrix, foaming occurs. In this situation the height of the edge portion 13 of this discrete portion of the black matrix 12 is reduced to be thinner than other portions. When the colored layer 8 is applied by the DFL method, foaming is prevented as discussed above. FIGS. 14A and 14B schematically exemplify the constitutions of the LCD devices incorporating the color filter shown in FIGS. 13A and 13B.

Figure 15A:
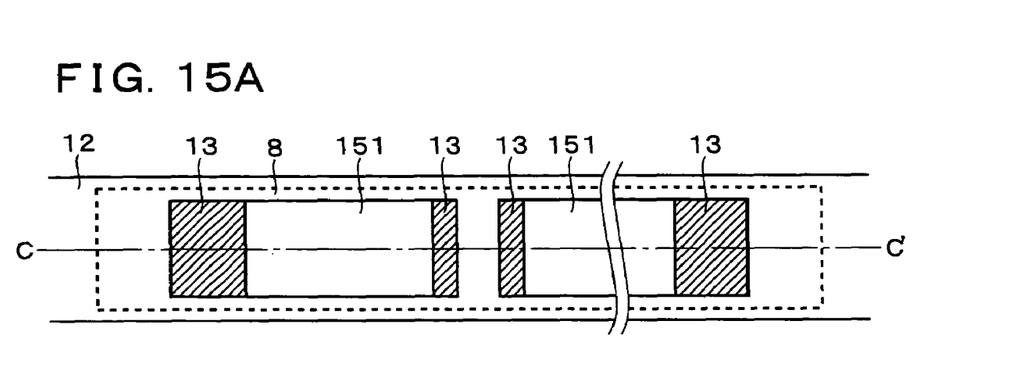
FIG. 15A and FIG. 15B schematically illustrate a plan view and a cross-sectional view, respectively, of a color filter prepared by a process according to the present invention, in which edges with a height lower than that of other portions of the resinous black matrix are disposed on both sides thereof.
Figure 15B:
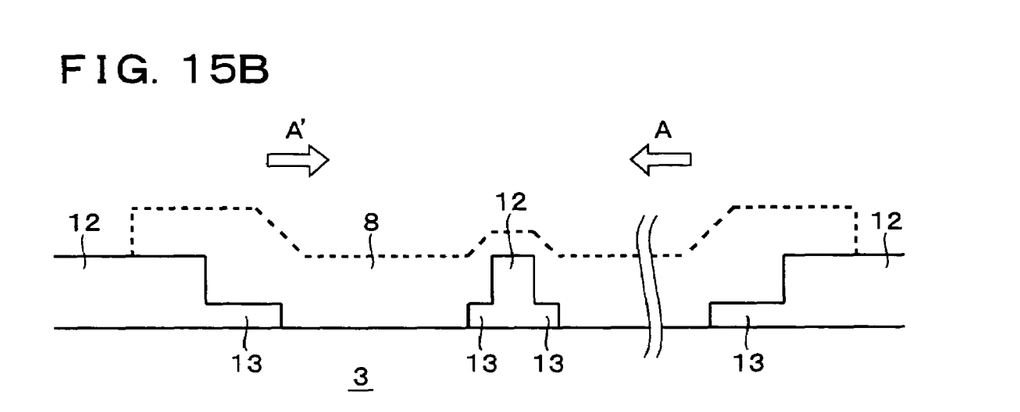
Figure 16A:
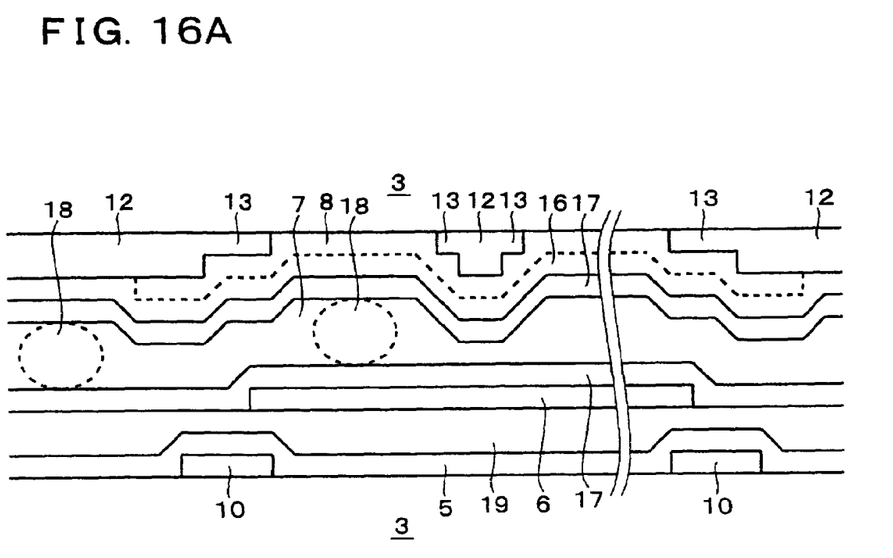
FIG. 16A and FIG. 16B schematically illustrate specific examples of LCD devices incorporating the color filter shown in FIGS. 15A and 15B.
Figure 16B:
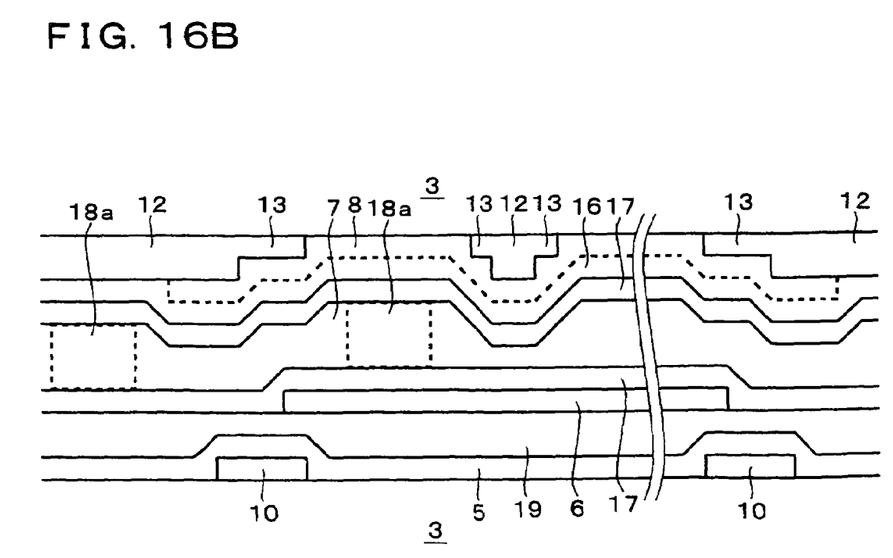

In the above embodiments, it is so arranged that only the edge portion 13 on one side of the resinous black matrix 12 is lowered with respect to other portions. However, as shown in FIGS. 15A and 15B, it is also allowable to lower edges 13 on both sides of respective black matrix portions. By implementing this arrangement it is possible to paste the colored layers 8 in the inverse direction indicated by the other arrowed line A' as well as in the direction of arrow A. In consequence, even when disposing the substrate 3 loaded with the resinous black matrix 12 in an inverse direction into a laminating unit, it is possible to prevent foaming and improve the yield rate. Thus, it is no longer necessary to regulate the installing direction of the substrate 3, thus promoting efficiency of the laminating process. Examples of the inventive LCD devices incorporating the color filter exemplified in FIGS. 15A and 15B are schematically shown in FIGS. 16A and 16B.

This specification has referred to LCD devices as products of the present invention. However, a color filter may be applied in accordance with the manufacturing method of the present invention to other display devices such as a plasma display device.

As is apparent from the above description, the present invention may also be implemented by way of modifications or changes within the scope of the amended claims without diverging from the essentials set forth in the above description.

What is claimed is:

1. A method for fabricating a color filter by bonding a colored film on a substrate having a resin black matrix formed thereon, comprising:

forming the resin black matrix on the substrate to have a step structure at an intersection of a thinner edge portion and a portion of the resin black matrix contiguous with the thinner edge portion; and bonding the colored film onto the substrate in a direction whereby the colored film first contacts the resin black matrix on an upstream side at the thinner edge portion, wherein the thinner edge portion is formed on the upstream side of the step structure.

2. The method for fabricating a color filter according to claim 1, wherein the resin black matrix is formed of a negative resist by exposure through openings formed in a mask followed by development, and a plurality of minute openings are formed in a portion of the mask corresponding to said edge portion of the resin black matrix so that said edge portion of the resin black matrix is thereby made thinner than the adjacent portion thereof.

3. The method for fabricating a color filter according to claim 2, wherein the minute openings formed in the mask are substantially circular, substantially elliptic, or substantially polygonal in shape.

4. The method for fabricating a color filter according to claim 2, wherein, the ratio of an interval between adjacent minute openings to the size of the minute openings varies from one location to another in said mask.

5. The method for fabricating a color filter according to claim 1, wherein the width of the thinner edge portion of the resin black matrix is in a range of 25% to 50% of the total width of the resin black matrix.

6. The method for fabricating a color filter according to claim 1, wherein the thickness of the thinner edge portion of the resin black matrix is in a range from 0.5 µm to 1 µm.

7. A color filter comprising:

a substrate;

a resin black matrix formed on the substrate, having an opening within said matrix, and having a step structure; and a colored film covering a portion of the substrate located inside the opening of the resin black matrix and covering at least a portion of the resin black matrix, wherein the resin black matrix has an edge portion located along the opening in the resin black matrix and covered by the colored film, and wherein the step structure is formed at an intersection of the edge portion and a portion of the resin black matrix contiguous with said edge portion, and the edge portion is thinner than the portion of the resin black matrix contiguous with the edge portion.

8. The color filter according to claim 7, wherein the width of the edge portion of the resin black matrix is in a range of 25% to 50%, of the total width of the resin black matrix.

9. The color filter according to claim 7, wherein the thickness of the edge portion of the resin black matrix is in a range from 0.5 µm to 1 µm.

10. A display device comprising the color filter according to claim 7.

* * * * *